US009269074B2

(12) United States Patent
Advani

(10) Patent No.: US 9,269,074 B2
(45) Date of Patent: Feb. 23, 2016

(54) FACILITATING VIEWING OF TEMPORAL VALUES FOR MULTIPLE FIELDS

(71) Applicant: Oracle International Corporation, Redwood Shores, CA (US)

(72) Inventor: Pavan Advani, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 465 days.

(21) Appl. No.: 13/669,475

(22) Filed: Nov. 6, 2012

(65) Prior Publication Data

US 2014/0129913 A1 May 8, 2014

(51) Int. Cl.
*G06F 17/20* (2006.01)
*G06Q 10/10* (2012.01)
(52) U.S. Cl.
CPC .................................. *G06Q 10/101* (2013.01)
(58) Field of Classification Search
CPC .... G06F 17/243; G06F 17/241; G06Q 10/107
USPC ......................................................... 715/215
See application file for complete search history.

(56) References Cited

U.S. PATENT DOCUMENTS

| 5,307,455 | A | * | 4/1994 | Higgins | G09G 1/162 |
| | | | | | 345/418 |
| 6,988,241 | B1 | * | 1/2006 | Guttman | G06F 17/246 |
| | | | | | 707/E17.115 |
| 7,743,336 | B2 | | 6/2010 | Louch et al. | |
| 7,954,064 | B2 | | 5/2011 | Forstall et al. | |
| 8,046,677 | B2 | * | 10/2011 | Eischeid | G06F 17/246 |
| | | | | | 715/212 |
| 8,656,270 | B2 | * | 2/2014 | Rui | G06F 17/246 |
| | | | | | 707/661 |
| 2002/0091728 | A1 | * | 7/2002 | Kjaer | G06F 17/246 |
| | | | | | 715/212 |
| 2007/0130541 | A1 | | 6/2007 | Louch et al. | |
| 2009/0099866 | A1 | | 4/2009 | Newman | |
| 2009/0216556 | A1 | | 8/2009 | Martin et al. | |
| 2010/0064374 | A1 | | 3/2010 | Martin et al. | |

OTHER PUBLICATIONS

The American Heritage Dictionary (entry for "deem") [online] [available at https://www.ahdictionary.com/word/search.html?q=deem ] (retrieved Jun. 26, 2015).*
About layering data in dashboards: Panels and panel stacks, http://usagereports.elsevier.com/help/WebUserWebHelp/Lang_1033/Panels_and_panel_stacks.htm/, Downloaded circa Mar. 19, 2012, pp. 1-2.
Create and edit simple dashboards, http://docs.splunk.com/Special:SpecialLatestDoc?t=Documentation/Splunk/latest/User/Create simple dashboards, Downloaded circa Mar. 19, 2012, pp. 1-8.
Security Dashboard, http://help.mysonicwall.com/sw/eng/6005/ui2/25201/System_systemDashboardView.html, Downloaded circa Mar. 19, 2012, pp. 1-4.

* cited by examiner

*Primary Examiner* — Stephen Hong
*Assistant Examiner* — Shahid Khan
(74) *Attorney, Agent, or Firm* — IPHORIZONS PLLC; Narendra Reddy Thappeta

(57) ABSTRACT

An aspect of the present invention facilitates users to view temporal values for multiple fields. In one embodiment, a first value and a second value are displayed respectively for a first field and a second field, with the first value and second value representing temporal values at a first time instance for the two fields respectively. Upon receiving data representing a second time instance, the display is updated by displaying a third value and a fourth value for the first field and the second field respectively, with the third value and the fourth value representing corresponding temporal values at the second time instance for the two fields.

19 Claims, 10 Drawing Sheets

FIG. 5

```
<script>
  function expand(ele) {
    var fieldid = ele.parentNode.getAttribute("value");
    if(fieldid.indexOf("@") != -1) {
      var request = new ajaxRequest('http://www.acme.com/dashboard?id
        =289&fieldid='+fieldid, 'request=true', showReceived);
      request.sendGetData();
    }
  }                                                                          ← 510 function showReceived(returnData) {
    displayOptions(returnData.responseText);
  }                                                                          ← 515 function onInstanceSelect(selected) {
    window.location = http://www.acme.com/dashboard?id=289&instance='+selected;
  }                                                                          ← 520
</script>
...
<div id="chartpanel" class="jquerychart line" title="Sales Line Chart">
  <div id="x-axis">Northeast, Northwest, Southwest </div>
  <div id="y-axis">100, 200, 300, 400, 500, 600, 700</div>
  <ul id="firstset">
    <li id="Northeast" value="@dailysales-northeast[today,1 day ago,2 days ago,3 days ago,4 days ago]">
      <a href= "#" onclick="expand(this);">+</a>100</li>
    <li id="Northwest" value="@dailysales-northwest[today,1 day ago,2 days ago,3 days ago,4 days ago]">
      <a href= "#" onclick="expand(this);">+</a>100</li>
    <li id="Southwest" value="@dailysales-southwest[today,1 day ago,2 days ago,3 days ago,4 days ago]">
      <a href= "#" onclick="expand(this);">+</a>100</li>
  </ul>
</div>                                                                        ← 530
...
<div id="simplepanel" class="simplepanel" title="Sales Person Info">
  <ul id="dataset" value="102">
    <li id="salespersonname" value="">Mr. Name</li>
    <li id="salespersonphone" value="@salespersonphone[today,2 days ago]">
      <a href= "#" onclick="expand(this);">+</a>Phone: Number</li>
  </ul>
</div>                                                                        ← 540
```

FIG. 7

```
<script>
    function expand(ele) {
        var fieldid = ele.parentNode.getAttribute("value");
        if(fieldid.indexOf("@") != -1)
            displayLocalOptions(fieldid);
    }                                                                    ← 710 function onInstanceSelect(selected) {
        var lis = document.getElementsByTagName("li");
        for (var i=0; i < lis.lenght; i++){
            var fieldid = lis[i].getAttribute("value");
            if(fieldid.indexOf("@") != -1) {
                var startpos = fieldid.indexOf("selected") + selected.length + 1; var endpos = fieldid.indexOf(",", startpos);
                lis[i].innerHtml= '<a href="#" onclick="expand(this);">'+</a>' + slice(fieldid, startpos, endpos)+ ' , ' + selected;
            }
        }
    }                                                                    ← 720
</script>
...
<div id="chartpanel" class="jquerychart line" title="Sales Line Chart">
    <div id="x-axis">Northeast, Northwest, Southwest </div>
    <div id="y-axis">100, 200, 300, 400, 500, 600, 700</div>
    <ul id="firstset">
        <li id="Northeast" value="@dailysales-northeast[today:567,1 day ago:495,2 days ago:295,4 days ago:360]">
            <a href="#" onclick="expand(this);">+</a>567</li>
        <li id="Northwest" value="@dailysales-northwest[today:459,1 day ago:650,2 days ago:622,3 days ago:543,4 days ago:505]">
            <a href="#" onclick="expand(this);">+</a>459</li>
        <li id="Southwest" value="@dailysales-southwest[today:228,1 day ago:226,2 days ago:223,3 days ago:221,4 days ago:225]">
            <a href="#" onclick="expand(this);">+</a>228</li>
    </ul>
</div>                                                                   ← 730
...
<div id="simplepanel" class="simplepanel" title="Sales Person Info">
    <ul id="dataset" value="102">
        <li id="salespersonname" value="">Mr. Amar</li>
        <li id="salespersonphone" value="@salespersonphone[today:9900100021,1 day ago:9900100021,2 days ago:8821180007,
            3 days ago:8821180007,4 days ago:8821180007]"><a href="#" onclick="expand(this);">+</a>Phone: 9900100021</li>
    </ul>
</div>                                                                   ← 740
```

FACILITATING VIEWING OF TEMPORAL VALUES FOR MULTIPLE FIELDS

BACKGROUND OF THE INVENTION

1. Technical Field

The present disclosure relates to enterprise systems, and more specifically to facilitating users to view temporal values for multiple fields.

2. Related Art

A field generally refers to a variable that can take on multiple values. When each value has an associated time reference, the values are said to be temporal. For example, the daily sales of a company can be different for different days and thus the field 'daily sales' is said to have temporal values, with a corresponding value for each day.

There is often a need for users to view such temporal values for multiple fields. For example, a user may wish to view the daily sales of a company in different regions, with the daily sales of each region provided as a corresponding field. As another example, sales in each day may be viewed as one field, while the number of tourists each day can be another field.

It may be desirable to facilitate users to conveniently view the different temporal values for such multiple fields.

BRIEF DESCRIPTION OF THE DRAWINGS

Example embodiments of the present invention will be described with reference to the accompanying drawings briefly described below.

FIG. 5 depicts a portion of a web page (or corresponding file) containing notations in one embodiment.

FIG. 7 depicts a portion of a pre-processed web page (or corresponding pre-processed file) in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates users to view temporal values for multiple fields. In one embodiment, a first value and a second value are displayed respectively for a first field and a second field, with the first value and second value representing temporal values at a first time instance for the two fields respectively. Upon receiving data representing a second time instance, the display is updated by displaying a third value and a fourth value for the first field and the second field respectively, with the third value and the fourth value representing corresponding temporal values at the second time instance for the two fields.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
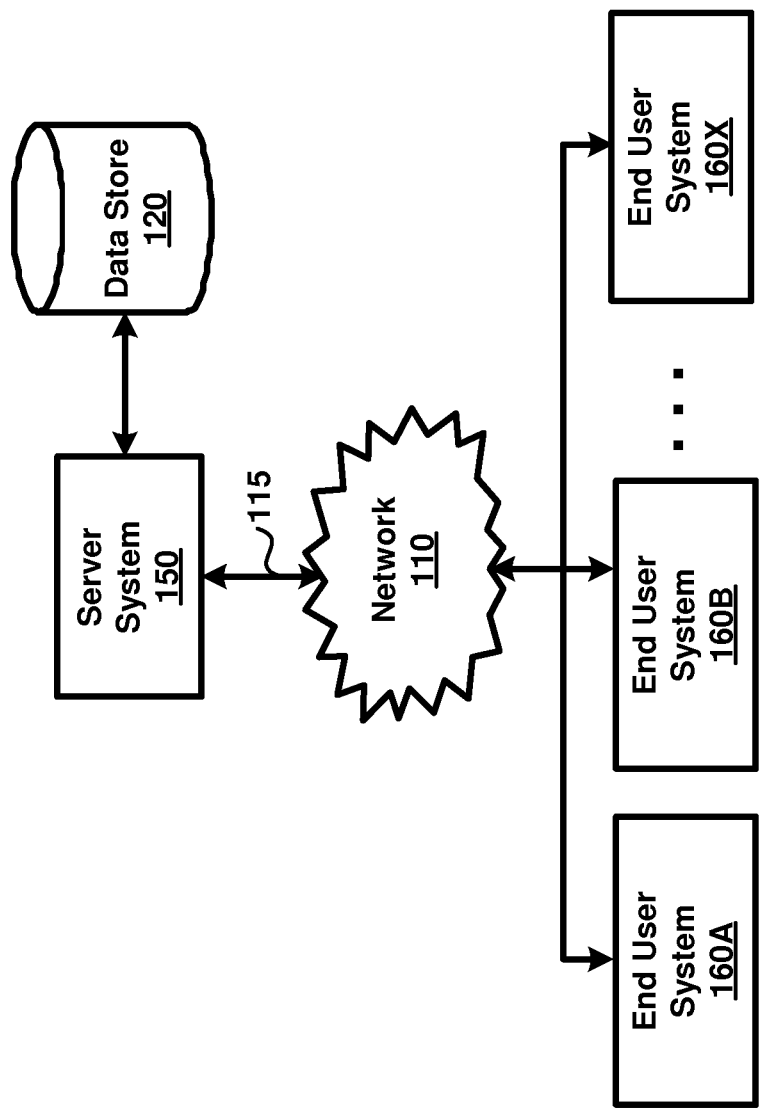
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing network 110, data store 120, server system 150 and end user systems 160A-160X.

Merely for illustration, only representative number/type of systems is shown in FIG. 1. Many environments often contain many more systems, both in number and type, depending on the purpose for which the environment is designed. Each system/device of FIG. 1 is described below in further detail.

Network 110 provides connectivity between server system 150 and end user systems 160A-160X, and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 110.

Data store 120 represents a non-volatile (persistent) storage facilitating storage and retrieval of data (such as the details of different fields, one more (temporal) values for each of the fields, etc.) by applications executing in server system 150. It should be appreciated that the fields and corresponding values may be available from different data stores, though the description herein is provided assuming that all the data/fields are available in data store 120. Data store 120 may be implemented as a database server according to relational database technologies and accordingly provide storage and retrieval of data using structured queries such as SQL (Structured Query Language). Alternatively, data store 120 may be implemented as a file server providing storage and retrieval of data in the form of files organized as one or more directories, as is well known in the relevant arts.

Each of end user systems 160A-160X represents a system such as a personal computer, workstation, mobile station, mobile phone, computing tablet, etc., used by users to generate (user/client) requests directed to applications executing in server system 150. The requests may be generated using appropriate user interfaces, for example, web pages provided by the applications executing in server system 150 and thereafter displayed using a browser in the end user systems. In general, a user sends client requests for performing desired tasks, such as viewing the values of fields, to server system 150 and receives corresponding responses containing the results of performance of the requested tasks. Each request is sent in the form of an IP packet directed to server system 150 (and corresponding application), with the IP packet including data identifying the desired tasks in the payload portion.

Server system 150 represents a system such as a web/application server executing applications capable of performing tasks requested by users, such as providing the values of fields requested by a user. In response to receiving client requests from end user system 160A-160X, the server system performs the tasks specified in the requests and sends the result of performance of the tasks to the requesting end user system. The server system may use data stored internally (for example, in a non-volatile storage/hard disk within the server), external data (for example, data store 120) and/or data received from external sources (e.g., from the user) in performing such tasks.

It may be appreciated that a user (using one of end user systems 160A-160X) may wish to view the temporal values of multiple fields. In one prior approach, the user is enabled to view the temporal values of a single field, for example, in the form of a graph showing the different values of the field at different time instances. In another prior approach, the values at a single time instance for multiple fields is provided together (e.g. in the form of a web page) to the user. The user may be accordingly required to request and view multiple web pages for viewing the values at different time instances for the multiple fields.

Server system 150, extended/provided according to several aspects of the present invention, facilitates users to view the temporal values (at different time instances) for multiple fields while overcoming at least some of the disadvantages noted above. The manner in which server system 150 facilitates users to view temporal values for multiple fields is described below with examples.

3. Viewing Temporal Values For Multiple Fields

Figure 2:
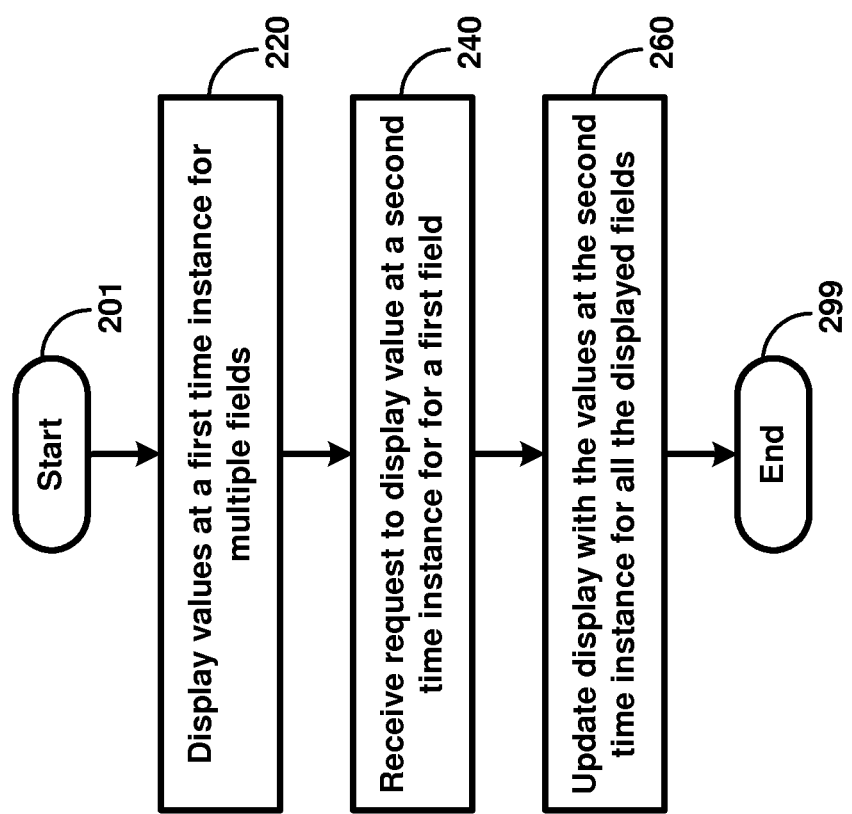
FIG. 2 is a flowchart illustrating the manner in which a user is facilitated to view temporal values for multiple fields according to an aspect of the present invention.

FIG. 2 is a flowchart illustrating the manner in which a user is facilitated to view temporal values for multiple fields according to an aspect of the present invention. The flowchart is described with respect to FIG. 1, and in relation to server system 150 merely for illustration. However, the features can be implemented in other environments (and in other servers) also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, server system 150 displays values at a first time instance for multiple fields. The values may be displayed in any convenient format using an appropriate user interface, for example, as parts of a web page. The user interface/web page may be provided by server system in response to a user request received from one of end user systems 160A-160X, and then later displayed on a display unit (not shown in FIG. 1) associated with the requesting end user system.

In step 240, server system 150 receives a request to display values at a second time instance for a first field (of the displayed multiple fields). The request may be received from a user using one of end user systems 160A-160X, for example, after the values at the first time instance are displayed as part of a user interface/web page (in step 220).

In step 260, server system 150 updates the display (e.g., the already displayed user interface/web page) with the values at the second time instance for all the displayed fields (of step 220). In other words, in response to a request for values at a second time instance for a first field displayed as part of a web page, the values at the second time instance for all the fields displayed as part of the web page are also updated. The second time instance may accordingly be viewed as a common time reference as well. The flow chart ends in step 299.

Thus, a user is facilitated to view temporal values for multiple fields using a single user interface/web page. The steps of 240 and 260 may be conveniently repeated to view the temporal values at different time instances for multiple fields on a single user interface/web page.

The manner in which server system 150 facilitates users to view temporal values for multiple fields according to the steps of FIG. 2 is described below with examples.

4. Illustrative Example

FIGS. 3A-3C, 4 and 5 together illustrate the manner in which a user is facilitated to view temporal values for multiple fields in one embodiment. Each of the Figures is described in detail below.

Figure 3A:
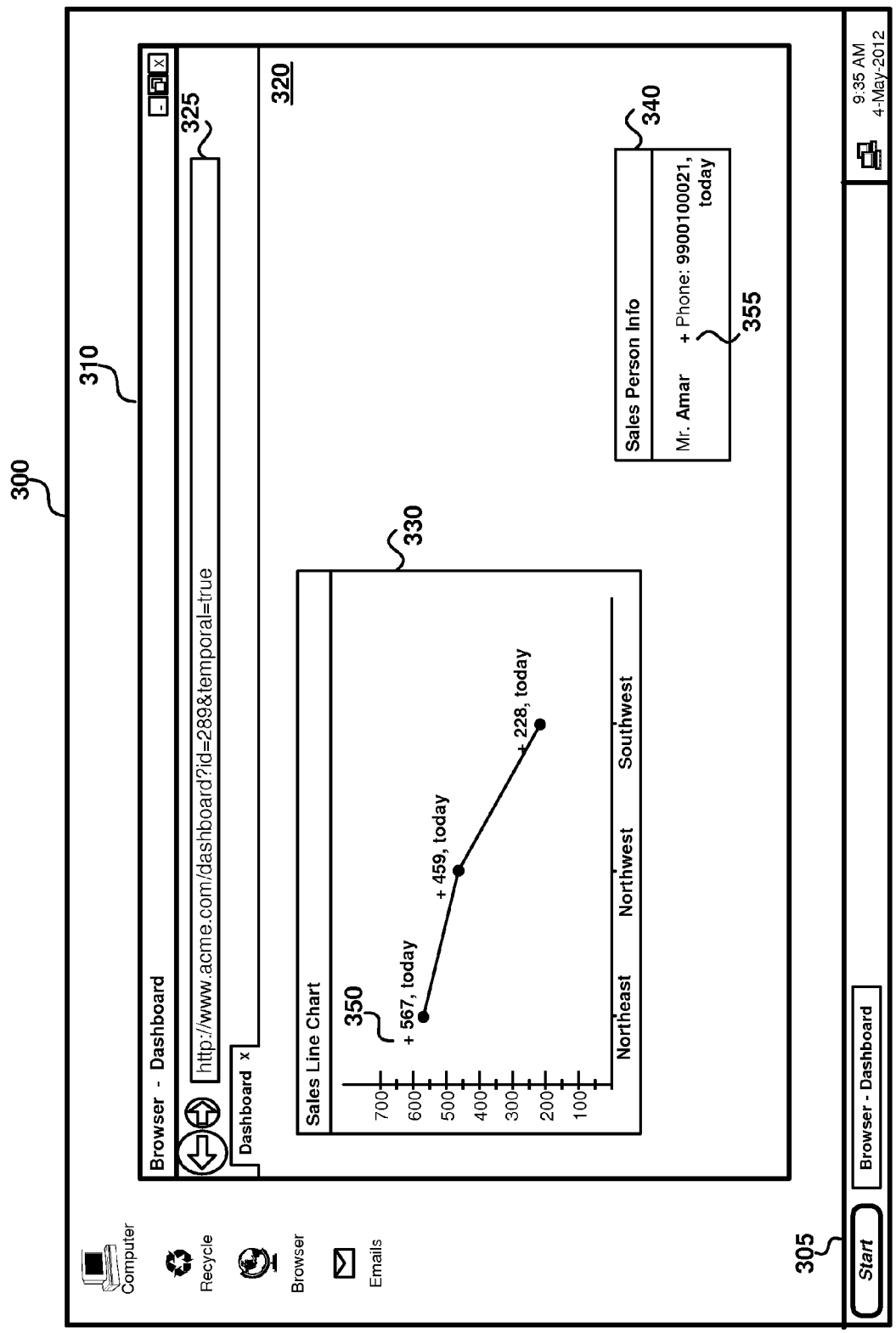
FIG. 3A depicts a graphical user interface that facilitates users to view temporal values for multiple fields in one embodiment.

FIG. 3A depicts a graphical user interface that facilitates users to view temporal values for multiple fields in one embodiment. Desktop 300 represents a portion of a screen provided by an operating system (such as Windows XP operating system available from Microsoft Corporation) executing in an end user system (assumed to be 160A, for convenience). Desktop 300 may be displayed on a display unit (not shown in FIG. 1) associated with end user system 160A.

Taskbar 305 is an interface element provided by the operating system to enable users to initialize and monitor applications (and the corresponding windows). In addition, taskbar 305 is shown indicating the current date "4 May 2012" and current time "9:35 AM" at the right hand corner of desktop 300. In the following description, it is assumed that the time reference for the values corresponds to that of the end user system (that is, values are displayed with respect to the time on the end user system as shown in the system tray), though in alternative embodiments, the time reference may correspond to that maintained in server system 150.

Window 310 represents a user interface provided by a browser application executing in end user system 160A. An icon labeled "Browser—Dashboard" corresponding to window 310 is accordingly shown in task bar 305. A user may send a request (to server system 150) for a desired web page by specifying the Universal Resource Locator (URL) of the desired web page in address field 325. The browser application then sends the request to server system 150, receives the corresponding requested web page, and then displays the received web page in display area 320. Accordingly in window 310, the user is shown specifying a URL in address field 325 for viewing the temporal values for fields of a specific dashboard (as identified by the id value "289"), with the browser application then displaying the requested dashboard in display area 320.

In general, a dashboard contains multiple fields that are grouped into one or more panels for convenience of the user. For example, dashboard 320 is shown containing two panels—Sales Line Chart panel 330 (hereafter referred to as "chart panel 330") and Sales Person Info panel 340 (hereafter referred to as "info panel 340). Though only a few panels are shown in dashboard 320 for illustration, it may be appreciated that a dashboard/web page may contain a large number of panels and fields as needed for a specific scenario, as will be apparent to one skilled in the relevant arts.

Chart Panel 330 is shown containing three fields, namely, the daily sales for Northeast, the daily sales for Northwest and the daily sales for Southwest. The respective values 567, 459 and 228 at the time instance of today (as indicated by the text "today") for the three fields are shown as data points of a line graph with the fields along the horizontal axis and the values along the vertical axis. In other words, the values for the three fields at 4 May 2012 (today) are displayed to the user as corresponding data points in chart panel 330. Info panel 340 is shown containing two fields, namely, the name of a sales person (handling the sales in the different regions) and the phone number of the sales person. The respective values ("Amar" and "9900100021") at the time instance of today (4 May 2012) for the two fields are shown being displayed in info panel 340.

Indicators 350 and 355 (and similar indicators) shown along with the values, indicates that the corresponding fields have temporal values associated with them, and the user may use the indicators to view the values at other time instances. Though the indicators are shown in the form of a text "+", it may be appreciated that in alternative embodiments, the indicators may be provided using other formats (such as graphical elements, colors, fonts, etc.) and/or other techniques (such as displaying the indicator only when a user hovers over the values using a mouse), as will be apparent to one skilled in the relevant arts by reading the disclosure herein.

It may be observed that the indicator is shown along with a value displayed in a graph (indicator 350) and also for a value associated with a text field such as the phone field in info panel 340 (indicator 355). In general, the indicator may be associated with the value of any field that is associated with temporal values, that is, any field for which server system 150 is designed to maintain values at different time instances. In one embodiment noted below, the specific fields having temporal values that are to be provided to a user are controlled by a developer of the user interface/web page as described in detail in below sections.

It may be further observed that the value "Amar" of the name of sales person field in info panel 340 is not shown associated with the indicator "+", thereby indicating that the name field does not have temporal values associated with it. A user is accordingly is not enabled to view the values for the name field at different the time instances. A typical user interface/web page may include such "non-temporal" fields (having no temporal value) along with other fields that have temporal values associated with them.

The manner in which a user may be enabled (to use indicators 350 and 355) to select the desired time instance and view the corresponding values at the selected time instance for multiple fields is described below with examples.

5. Selecting and Viewing Temporal Values at Another Time Instance

Figure 3B:
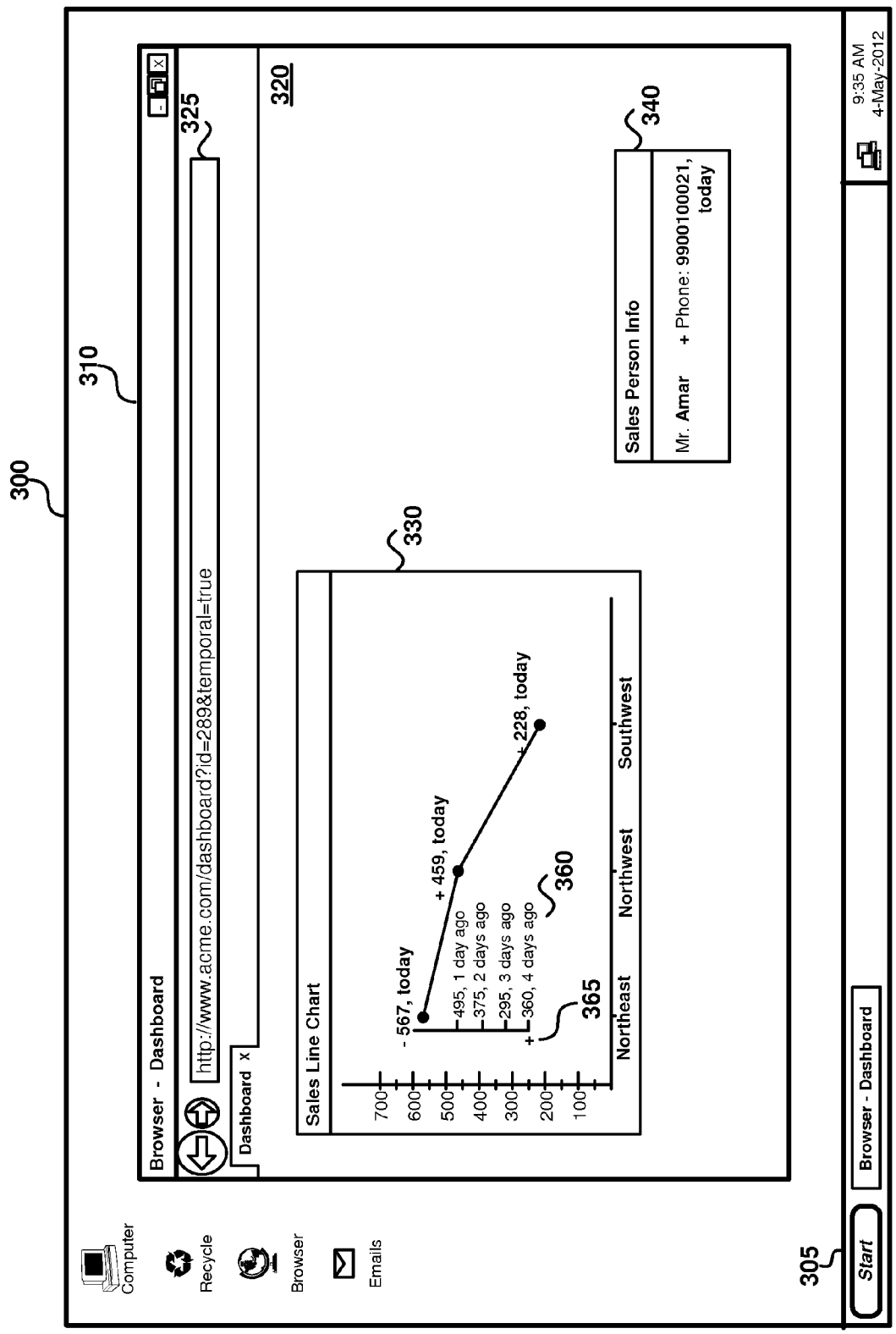
FIG. 3B illustrates the manner in which a user is enabled to select a desired time instance (for which values for multiple fields are sought to be viewed) in one embodiment.

FIG. 3B illustrates the manner in which a user is enabled to select a desired time instance (for which values for multiple fields are sought to be viewed) in one embodiment. Similar numbers are used to represent corresponding portions of FIGS. 3A, 3B, and 3C and hence descriptions of such portions are not repeated for conciseness.

Display area 360 depicts a set of time instances and corresponding values displayed in response to user selecting/clicking on (in general, operating) indicator 350 in chart panel 330. Display area 360 is shown displaying the list of values 495, 375, 295 and 360 at time instances 1 day ago (i.e., on 3 May 2012), 2 days ago (i.e., on 2 May 2012), 3 days ago (i.e., on 1 May 2012), and 4 days ago (i.e., on 30 Apr. 2012) for the field daily sales for Northeast.

An additional indicator 365 is also shown displayed along with the oldest value to indicate that there are older temporal values (that is at time instance prior to 30 Apr. 2012) available for the field daily sales for Northeast. A user may select/click on additional indicator 365 to view the older temporal values for the field. The older temporal values may be displayed similar to display area 360 or in any other convenient format.

A user may select any of the time instances shown in display area 360 to view the corresponding values of the fields of dashboard 320. The description is continued assuming that the user selects the time instance 3 days ago (1 May 2012) in display area 360. In response to such a selection, end user system 160A send a request for the value at the selected time instance 3 days ago (1 May 2012) for the field daily sales for Northeast to server system 150. The request may indicate the specific selected time instance (such as "3 days ago") and the current date and time "4 May 2012", thereby enabling the server system to calculate the specific date (1 May 2012) for which the temporal values are to be displayed. Alternatively, end user system 160A may be designed to calculate and include only the specific date in the request sent to server system 150.

Server system 150, in response to receiving such a request for a value at a second time instance for a first field, updates the display (dashboard 320) with the values at the second time instance (1 May 2012) for all the displayed fields of dashboard 320, thereby enabling the user to view the values at the selected time instance for multiple fields. The manner in which the user views the values at the selected time instance 3 days ago (1 May 2012) for multiple fields (of dashboard 320) is described below with examples.

Figure 3C:
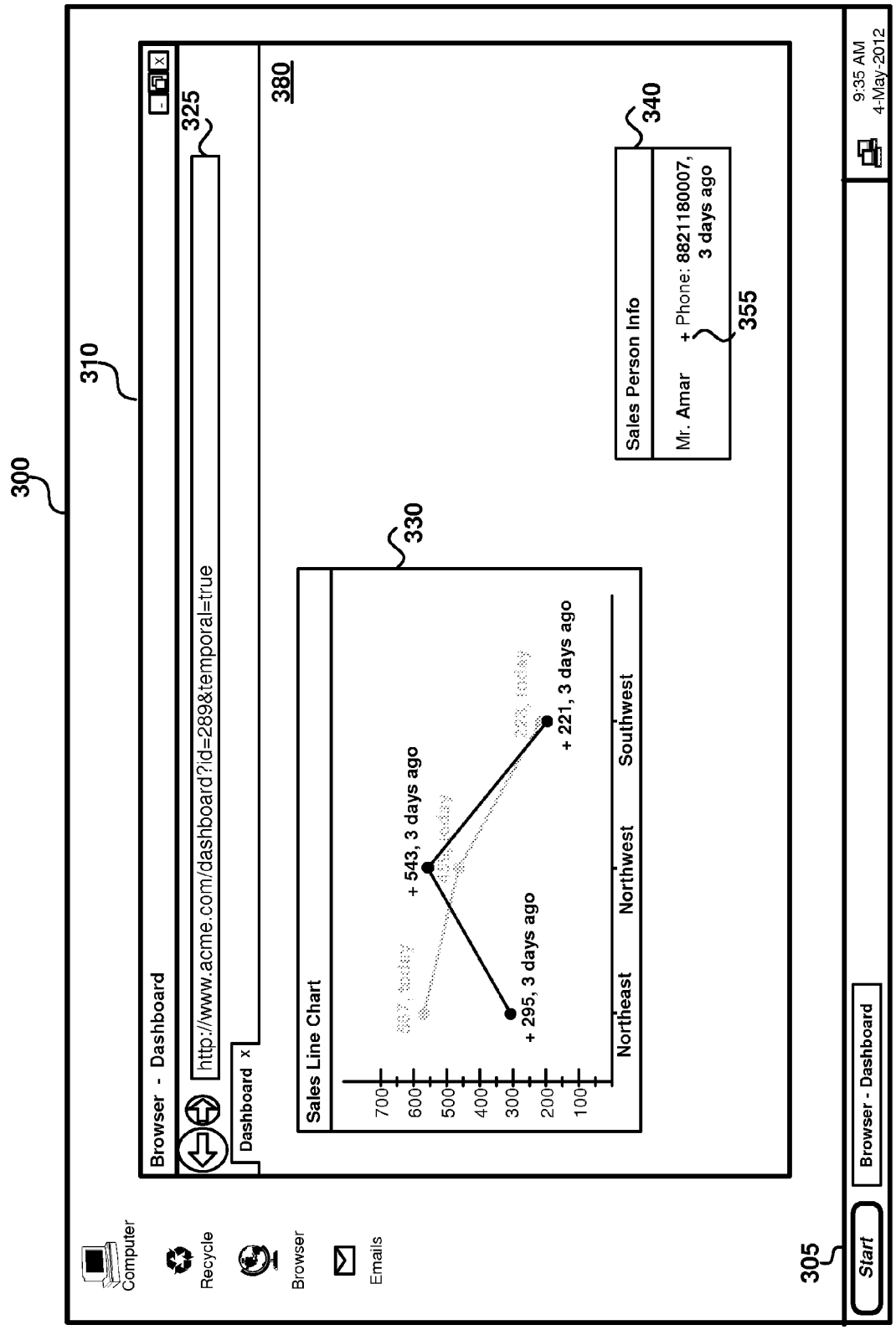
FIG. 3C illustrates the manner in which a user is enabled to view the values at a selected time instance for multiple fields in one embodiment.

FIG. 3C illustrates the manner in which a user is enabled to view the values at a selected time instance for multiple fields in one embodiment. Display area 380 depicts a dashboard displaying values at the user selected time instance 3 days ago (1 May 2012). In particular, all the three fields in chart panel 330 and also the phone field in info panel 340 are shown updated with the corresponding values at the selected time instance 3 days ago (1 May 2012). It may be observed that the previous value (at time instance today) of the phone field has been replaced by the new value (at time instance 3 days ago). The previous value is not visible to the user due to the replacement (though the value may still be viewed by clicking on indicator 355).

According to an aspect of the present invention, values at different time instances (either provided initially or later selected by the user) for multiple fields are provided simultaneously on the same display interface/screen. In one embodiment, the values at a first time instance for the multiple fields are shown according to a first visual convention (a specific combination of visual attributes such as font, font size, font color, background color, connecting lines, associated images, etc.), while the values at a second time instance are shown according to a second visual convention (another combination of visual attributes). The first and second visual conventions may be chosen to together communicate (to the users) that the temporal values are being displayed for different time instances.

Charts panel 330 is accordingly shown displaying simultaneously the values at both the initial time instance (today) and the user selected time instance (3 days ago) for the fields: daily sales for Northeast, daily sales for Northwest and daily sales for Southwest. The values and corresponding line graph at currently selected time instance (3 days ago) are shown in black color (the first visual convention), while the values and corresponding line graph at the previous time instance (today) are shown in gray color (a second visual convention). By choosing such a combination, the values/graph at the previous time instance appear to be in the background, while the values/graph as the user selected time instance appear to be in the foreground.

A user may select any of the three values at the previous time instance to cause the values and corresponding line graph at the previous time instance to be displayed in the foreground (the first visual convention), with the values and corresponding line graph at the currently viewed (that is the user selected) time instance displayed in the background (the second visual convention). Such a display simplifies the user task of comparing the values at different time instances for multiple fields.

While the graph of FIG. 3C is shown with temporal values for only two time instances, it should be appreciated that data corresponding to additional time instances can be similarly displayed on the same screen (at the same time) simultaneously upon user selection of such time instances. The technique associated with indicator 350 described above, can be used for specifying such additional time instances. The user may then select the specific one or more sets of values/line graphs at the additional time instances to be displayed in the foreground or background (using the techniques noted above).

Thus, a user by selecting a time instance for a single field is facilitated to view the values at the selected time instance for all the displayed fields (in dashboard 320). The manner in which server system 150 may be implemented to provide the user interfaces of FIGS. 3A-3C to users is described below with examples.

6. Example Implementation

Figure 4:
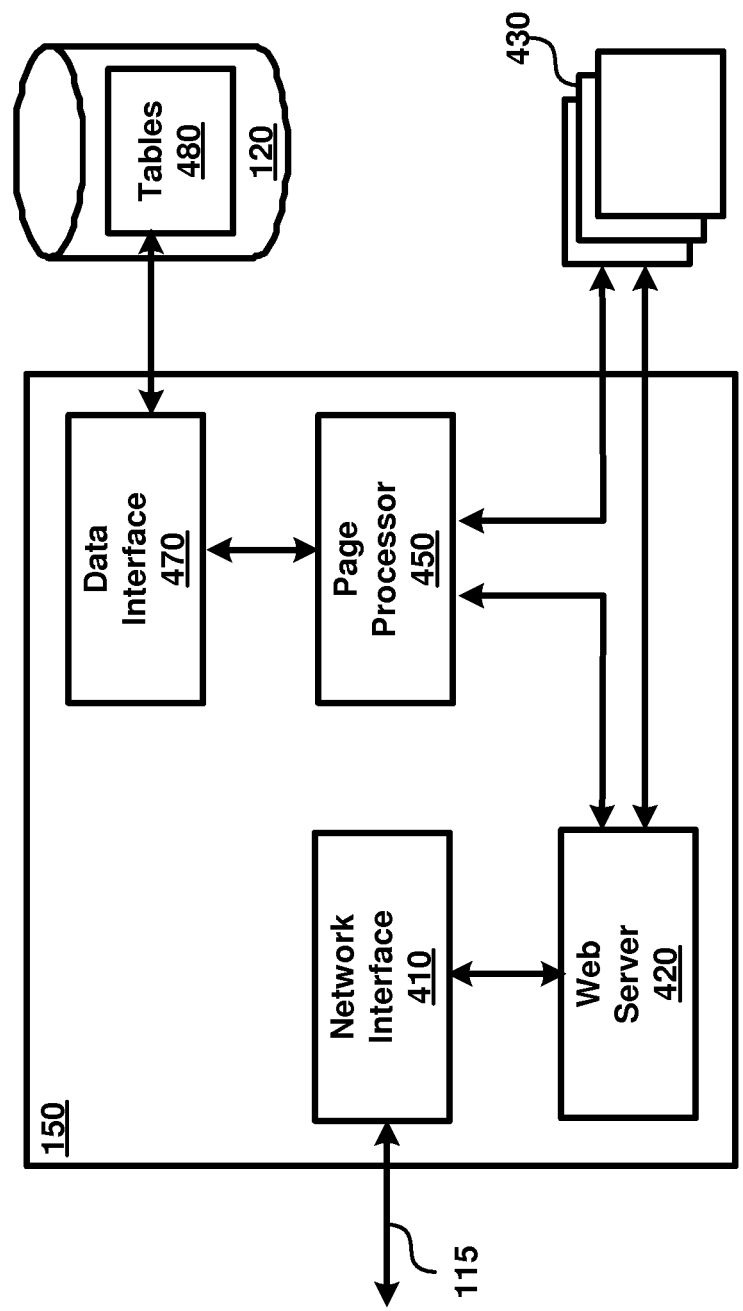
FIG. 4 is a block diagram of a server system designed to facilitate uses to view temporal values for multiple fields in one embodiment.

FIG. 4 is a block diagram of a server system (150) designed to facilitate uses to view temporal values for multiple fields in one embodiment. The block diagram is shown containing network interface 410, web server 420, page processor 450 and data interface 470 (all within server system 150), files 430 and tables 480 (within data store 120). Each of the blocks is described in detail below.

Network interface 410 receives client requests from an end user system (such as 160A) via path 115 and forwards the received requests to web server 420. Upon receiving from web server 420, web pages corresponding to the requests, network interface forwards the web pages (via path 115) to the requesting end user system. Network interface 410 may maintain addition data (not shown) to co-relate the requests and the corresponding end user systems from which the requests are received, as is well known in the relevant arts. Network interface 410 may also receive and maintain the current date and time at each of the end user systems as part (for example, as the value of "Date" field in the HTTP header) of the requests.

Web server 420 receives client requests (forwarded by network interface 410) and determines the appropriate web pages corresponding to each client request. The determination may be performed by inspecting the URL contained in each request and a mapping data (provided by an administrator) indicating the specific web pages that are mapped to respective URLs. In one embodiment, each web page is stored in the form of a corresponding set of files contained in files 430, with the mapping data specifying the set of files mapped to each URL.

Web server 420, accordingly, first determines the specific set of files based on the mapping data and the request URL, retrieves the determined set of files from files 430 as the requested web page and then sends the retrieved set of files to the requesting end user system (using network interface 410). Examples of such web servers are Apache HTTP (hypertext transfer protocol) server available from Apache Software Foundation and IIS (Internet Information Services) server available from Microsoft Corporation.

Files 430 contain one or more files such as HTML (hypertext markup language) files, Javascript files, style sheets, images, text files, etc. that are served by web server 420 in response to client requests. As is well known, some of the files may be "static" files/web pages that are ready to be served, while some of the files may be "dynamic" wherein the files act as web page templates that are to be filled with values dynamically (at the point of serving each request for the corresponding web page). As such, web server 420 upon retrieving a static file is designed to forward the file to the end user system, while upon retrieving a dynamic file is designed to invoke an application (pre-configured based on the name, type, and/or content of the file) for filling the web page templates and then forward the filled web page to the end user system.

According to an aspect of the present invention, a developer of the web pages is enabled to indicate in the content of a web page/file by adding a pre-defined notation, the specific fields that are associated with temporal values. In other words, the developer by adding the notation to the desired fields indicates the availability of temporal values for such notated fields. The manner in which notations may be added (by a developer) and later processed by server system 150 is described below with examples.

7. Adding and Processing Notations

FIG. 5 depicts a portion of a web page (or corresponding file in files 430) containing notations in one embodiment. The web page is shown containing instructions according to multiple web technologies (such as HTML and Javascript, well known in the relevant arts) only for illustration. However, the features of the present invention may be implemented in alternative embodiments where the web pages also contain instructions according to other web technologies (such as Flash available from Adobe Corporation and JQuery available from JQuery Team) as will be apparent to one skilled in the relevant arts by reading the disclosure herein.

In the following description, it is assumed that developers use the notation "@ fieldname [time instance 1,timeinstance2, . . . ]" to indicate the fields having temporal values. It is further assumed that all fields are specified using "li" (list item) HTML elements, with the value attribute of the "li" element indicating whether the field has temporal values (value attribute set to the notation string "@fieldname[time instances]") or not (value attribute set to the empty string " "). However, the features of the present invention may be implemented in alternative embodiments employing any other convenient notation and/or configuration specified as part of or external to (for example, in another file) the web page, as will be apparent to one skilled in the relevant arts by reading the disclosure herein.

Each of data portions 510, 515 and 520 depicts instructions according to Javascript, while data portions 530 and 540 depicts instructions according to HTML. Data portions 510, 515 and 520 are operative only on end user system 160A (after the web page is received and displayed by the browser application), and are accordingly described in detail in the below sections.

Data portions 530 and 540 contain instructions that when processed (along with other files) by the browser application in end user system 160A, causes the display of chart panel 330 and info panel 340 respectively. It may be observed that each of the three daily sales fields in chart panel 330 is indicated (using the above noted notation) to be a field having temporal values, while only the phone field in info panel 340 is indicated to be a field having temporal values. The absence of the notation (that is the setting to the empty string "") in the value attribute of the "li" element having the id attribute set to "salespersonname" in data portion 540 indicates that the name field does not have temporal values.

It may be further observed that the notation in data portions 530 and 540 indicates the name of the respective fields (such as "dailysales-northeast", "salespersonphone", etc.) and also the time instances (such as "today", "1 day ago", etc. within the square brackets) at which the temporal values are available for each field. It may be noted that only the temporal values for two of the days is available for the phone field, while the temporal values for multiple days are available for the daily sales fields (specified in data portion 530). Furthermore, the fields are shown containing some dummy values such as "100", "Mr. Name", "Phone: Number", etc. as placeholders for the actual values to be replaced during processing of the page, as described in detail below with respect to FIG. 6.

In one embodiment, web server 420 is designed to check whether value attributes (specifically for "li" HTML elements) containing the "@" character are present in a web page requested by an end user system. In the scenario that such a value attribute does not exist, web server 420 forwards the file (after filling the web page if required) to the end user system. Alternatively, web server 420 invokes/sends the web page to page processor 450. In an alternative embodiment, web server 420 is designed to perform the above check only when the web page request indicates that the temporal values of interest (for example, by including the string "temporal=true" in the URL as shown in address field 325).

Thus, in response to the URL shown in address field 325, web server 420 retrieves the corresponding dashboard web page/file shown in FIG. 5, identifies that the dashboard page contains fields having temporal values, and then sends the dashboard web page to page processor 450 along with the indication that the temporal values for 4 May 2012 (received in the request as the date corresponding to "today") are to be filled in the dashboard page.

Referring back to FIG. 4, page processor 450 receives a web page (containing fields having temporal values) from web server 420 and then determines the specific fields and corresponding temporal values (for example, corresponding to time instance "today") to be included in the web page. Page processor 450 then retrieves (using data interface 470) the determined values for the specific fields, includes the values in the web page and then forwards the filled web page/file to web server 420, which in turn forwards the filled web page to the requesting end user system.

Data interface 470 facilitates the storage and retrieval of data from/to tables 480 in data store 120, and is accordingly implemented consistent with the implementation of data store 120. In one embodiment, data store 120 is implemented as a database server according to relational database technologies, with tables 480 maintained in a database on the database server. Data interface 470 is accordingly implemented to establish connections with the database server and to execute SQL queries using the established connections.

The manner in which temporal values may be maintained in a database server (in particular, in tables 480) is described below with examples.

8. Sample Temporal Values

Figure 6:
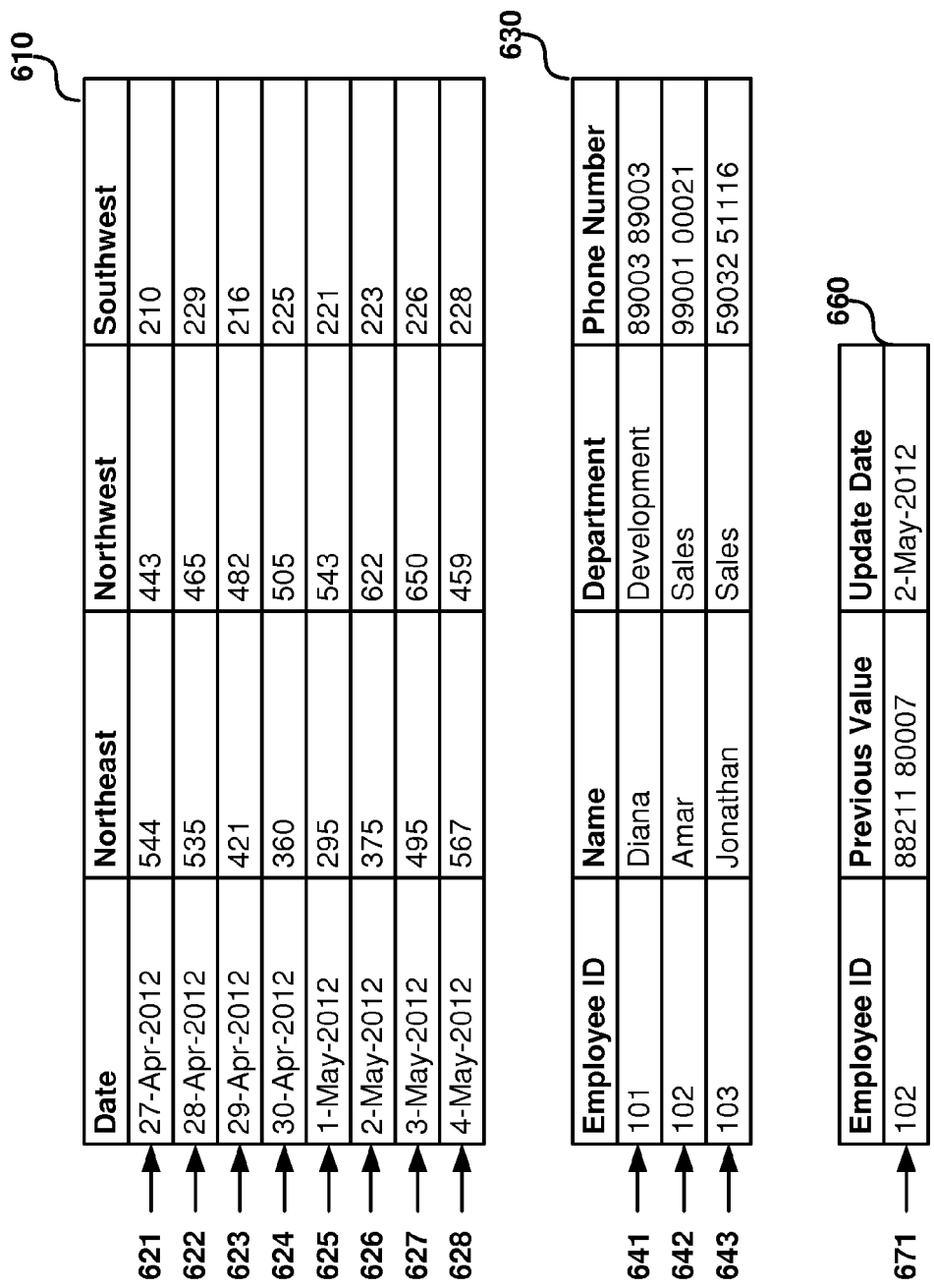
FIG. 6 depicts a portion of a temporal data containing temporal values for multiple fields in one embodiment.

FIG. 6 depicts a portion of a temporal data (tables 480) containing temporal values for multiple fields in one embodiment. As noted above, the temporal data is shown maintained in the form of one or more tables, each table containing rows and columns. However, in alternative embodiments, the temporal data may be maintained using other data formats such as extensible markup language (XML), as will be apparent to one skilled in the relevant arts by reading the disclosure herein.

Daily sales table 610 is shown containing the columns "Northeast", "Northwest" and "Southwest" indicating the daily sales in each of the corresponding regions on the date indicated in column "Date". Each of rows 621-628 specifies the corresponding values of the three regions on the corresponding dates. For example row 621 specifies that the daily sales for the "Northeast", "Northwest" and "Southwest" regions on 27 Apr. 2012 are 544, 443 and 210 respectively. Thus, daily sales table 610 may be viewed as maintaining the temporal values of the three daily sales fields corresponding to the three different regions.

It may be appreciated tables 480 may not have a schema (rows and columns) that supports storing of the temporal values of all the fields specified by a developer. In one embodiment, page processor 450 is designed to inspect files 430 to identify the fields that are specified to have temporal values (based on the notation noted above), and then check whether the schema of tables 480 allows storage of the temporal values of the identified fields. In a scenario that the schema is determined to not allow temporal values of an identified field, page processor 450 modifies the schema to enable the storage of temporal values.

For example, employee table 630 is shown containing the columns "Employee ID", "Name", "Department" and "Phone Number" respectively specifying the employee identifier, the name, the department and the phone number of each employee. Each of rows 641-643 specifies the details of a corresponding employee. For example, row 642 specifies an employee having the employee identifier "102" and the name "Amar" working the department "Sales" and using the phone number "9900100021". It may be readily appreciated that such an employee table is not conducive for storage of temporal values (for example, for the phone numbers).

Page processor 450, in response to identifying that the temporal values of the phone number field are desirable (based on the notation in data portion 540), creates an additional phone audit table 660 for storing the temporal values of the phone number column. Phone audit table 660 is shown containing the column "Employee ID" identifying the employee, the "Previous Value" indicating the previous value that was replaced by the current value shown in the "Phone Number" column of employee table 630, and column "Update Date" indicating the date on which the previous value was replaced by the current value. Thus, row 671 indicates that for the employee having employee ID "102" (that is, for the employee named "Amar"), the previous phone number "8821180007" was replaced by the current value "9900100021" on 2 May 2012.

It may be appreciated that the values in the phone audit table 660 may be automatically updated when the corresponding changes are sought to be made in employee table 630. For example, page processor 450, in addition to creating table 660, may also create SQL triggers that are designed to be executed during the update of table 630. The SQL triggers upon execution cause the storage of the corresponding values (such as row 571) in table 660.

Thus, in response to a request for filling temporal values at "4 May 2012" in a dashboard web page (as shown in FIG. 5), page processor 450 retrieves the values 567, 459 and 338 corresponding to the date "4 May 2012" from daily sales table

610 (row 628) and then replaces the dummy value "100" with the corresponding values in data portion 630. Similarly, page processor 450 retrieves the values "Amar" and "9900100021" corresponding to employee id "102" (as indicated by the value of the "ul" HTML element) from employee table 630 (row 642) and then replaces the dummy values "Mr. Name" and "Phone: Number" with the corresponding text "Mr. Amar" and "Phone: 9900100021" in data portion 630.

Page processor 450 also adds the text ", today" to each of the values to indicate the time instance, according to a visual convention to indicate temporal values. However, in other embodiments, any convenient visual convention may be used to indicate the fields having temporal values, as will be apparent to one skilled in the relevant arts by reading the disclosure herein.

According to an aspect of the present invention, page processor 450 is also designed to add the time instances at which temporal values are available for each fields in a (dashboard) web page. In one embodiment, the web page only includes the notation "@fieldname" (e.g., "@dailysales-northeast"), with page processor 450 then identifying such notated fields, querying tables 480 (e.g., Date column in table 610) to determine the time instances at which the temporal values are available for such notated fields, and add the determines time instances in a user-friendly manner to the notation (e.g., "[today,1 day ago,2 days ago,3 days ago,4 days ago]"). The specific/maximum number of time instances to be added may be pre-configured by an administrator of server system 150.

Thus, after filling the web page with values and time instances, page processor 450 forwards the filled web page to web server 420, which in turn forwards the filled web page to requesting end user system 160A (from which the URL was received earlier). The browser application executing in end user system 160A then displays the filled web page in window 310 thereby producing the output of display area 320 of FIG. 3A.

As noted above, a user may thereafter select and view the temporal values at other time instances. The manner in which the web page of FIG. 5 facilitates the user to select and view temporal values, and the corresponding manner in which server system 150 retrieves and updates the temporal values is described below with examples.

9. Retrieving and Updating Temporal Values

Referring back to FIG. 5, it may be observed that data portions 530 and 540 includes the indicator text "+" (corresponding to indicators 350 and 355 shown in display area 320), which upon selection is designed to invoke the Javascript function expand( ) shown in data portion 510. In data portion 510, the expand function is designed to determine the field identifier of the indicator selected by the user (e.g. 350), and to send an AJAX request to server system with the determined field identifier (e.g. "@dailysales-northeast[today,1 day ago,2 days ago,3 days ago,4 days ago]") and the current date (4 May 2012) and time at the end user system. Data portion 510 also indicates that the function showReceived( ) in data portion 515 is to be invoked with the AJAX response.

Upon receiving the AJAX request, web server 420 forwards the request to page processor 450, which in turn queries tables 480 for determining the requested temporal values and sends the determined values as a response to the AJAX request. For example, in response to the above noted example request, page processor retrieves and sends (as an AJAX response) the values 495, 375, 295 and 360 (from rows 624-627) corresponding to the time instances noted in the request.

In end user system 160A, the shownReceived function in data portion 515 receives the AJAX response and invokes the function displayOptions( ), which displays the values 495, 375, 295 and 360 and corresponding time instances as shown in display area 360 of FIG. 3B. Upon a user selecting a time instance (such as "3 days ago"), the function on InstanceSelect( ) shown in data portion 520 is invoked, which in turn sends a request to server system 150 for an update of the dashboard with the selected time instance.

Upon receiving the update request, web server 420 again forwards the request to page processor 450. Page processor 450, in turn queries tables 480 for determining the temporal values at the selected time instance for all the fields in the dashboard web page and then fills (by replacing the older values in) the web page with the determined values. For example, in response to an update request for "3 days ago" (i.e., "1 May 2012"), page processor 450 retrieves the values 295, 543 and 221 corresponding to the date "1 May 2012" from daily sales table 610 (row 625) and then replaces the older values with the corresponding values in data portion 630. Similarly, page processor 450 also retrieves the value "8821180007" corresponding to employee id "102" from phone audit table 660 (row 671) and then replaces the old value with the corresponding text "Phone: 8821180007" in data portion 630. Page processor 450 also adds the text ", 3 days ago" to each of the values to indicate the time instance.

The newly filled dashboard web page is then forwarded by page processor 450 to web server 420, which in turn forwards the filled web page to requesting end user system 160A (from which the URL was received earlier). The browser application executing in end user system 160A then displays the filled web page in window 310 thereby producing the output of display area 380 of FIG. 3C.

Thus, server system 150 retrieves and updates the temporal values in a dashboard web pages in response to user actions performed on the web page. It may be appreciated that in some scenarios (for example, when the end user system is a mobile phone), it may be desirable that the updates to the dashboard be performed on the client/end user system (without requiring requests to be sent to the server system).

According to an aspect of the present invention, page processor 450 is designed to pre-process a (dashboard) web page such that a browser application executing in an end user system (160A-160X) is facilitated to update the web page without sending requests to server system 150. The manner in which such pre-processing and client system update may be performed is described below with examples.

10. Pre-processing Web Pages and Client System Update

Broadly, pre-processing of a web page entails determining the temporal values of each of the fields in the web page, and including the temporal values along with the corresponding time instances as part of the web page instructions. Pre-processing also ensures that appropriate Javascript functions designed to update the web page (without sending server requests) are also included as part of the web page. The pre-processing may be performed in response to a request for the web page or may be performed periodically for each file in files 430.

For example, in response to the request containing the URL shown in address field 325, page processor 450 may perform pre-processing of the web page shown in FIG. 5 before sending the pre-processed web page as the response to the request. In particular, page processor 450 retrieves the values from tables 480 corresponding to multiple time instances for each of the fields in the web page and includes the retrieved values as part of the web page. The specific/maximum number of time instances (assumed to be 5 in the below disclosure) to be included may be pre-configured by an administrator. In one embodiment, the retrieved values are included as part of the notation noted above, for example, in the form "@fieldname

[time instance1:value1,timeinstance2:value2, . . . ]". Also the functions expand( ) and on Ins tance Select( ) in data portions 510 and 520 are modified to operate with the modified notations.

FIG. 7 depicts a portion of a pre-processed web page (or corresponding pre-processed file in files 430) in one embodiment. In particular, the data portions of FIG. 7 depict the output of pre-processing the web page shown in FIG. 5. Each of data portions 710 and 720 are accordingly similar to data portions 510 and 520, but now contain instructions (according to Javascript) for operating with the modified notations.

Data portions 730 and 740 are similar to data portion 530 and 540 of FIG. 5, and contain instructions that when processed (along with other files) by the browser application in end user system 160A, causes the display of chart panel 330 and info panel 340 respectively in display area 320. However, it may be observed that each of data portions 730 and 740 now contains the values at different time instances for each field in the corresponding notation. For example, for the field "@dailysales-northeast" in data portion 730, the corresponding values 567, 495, 375, 295 and 360 at the 5 time instances today (4 May 2012) 1 day ago (3 May 2012), 2 days ago (2 May 2012), 3 days ago (1 May 2012), and 4 days ago (30 Apr. 2012) are shown included in the notation.

Thus, after pre-processing the web page with values and time instances, server systems 150 sends the pre-processed web page to requesting end user system 160A. The browser application executing in end user system 160A then displays the pre-processed web page in window 310 thereby producing the output of display area 320 of FIG. 3A.

Upon a user clicking an indicator (e.g. 350), the expand( ) function of data portion 710 is invoked. The expand( ) function in turn invokes the function displayLocalOptions( ), instead of sending an AJAX request to the server system. The displayLocalOptions( ) function (not shown) determines the values and corresponding time instances available for the selected field based on the modified notation, and then displays the values and corresponding time instances (e.g., as shown in display area 360 of FIG. 3B).

Upon a user selecting a time instance (such as "3 days ago"), the on InstanceSelect( ) function shown in data portion 720 is invoked. In data portion 720, all the "li" HTML elements (that is, all the fields) are first determined and then checked whether the field has temporal values (based on whether the string for the value attribute of the "li" element is empty or has the modified notation). For each field determined to have temporal values, the value at the selected time instance is extracted from the modified notation text (the slice operation shown there), and the previous value ('innerHTML') replaced with the extracted value. By performing the above operation for each field, all the fields in the web page are updated with the corresponding values at the selected time instance.

Thus, pre-processing of the web page to include the temporal values in the web page facilitates the browser application executing in end user system 160A to update the (dashboard) web page, without sending requests to server system 150.

It should be further appreciated that the features described above can be implemented in various embodiments as a desired combination of one or more of hardware, executable modules, and firmware. The description is continued with respect to an embodiment in which various features are operative when corresponding executable modules are executed.

11. Digital Processing System

Figure 8:
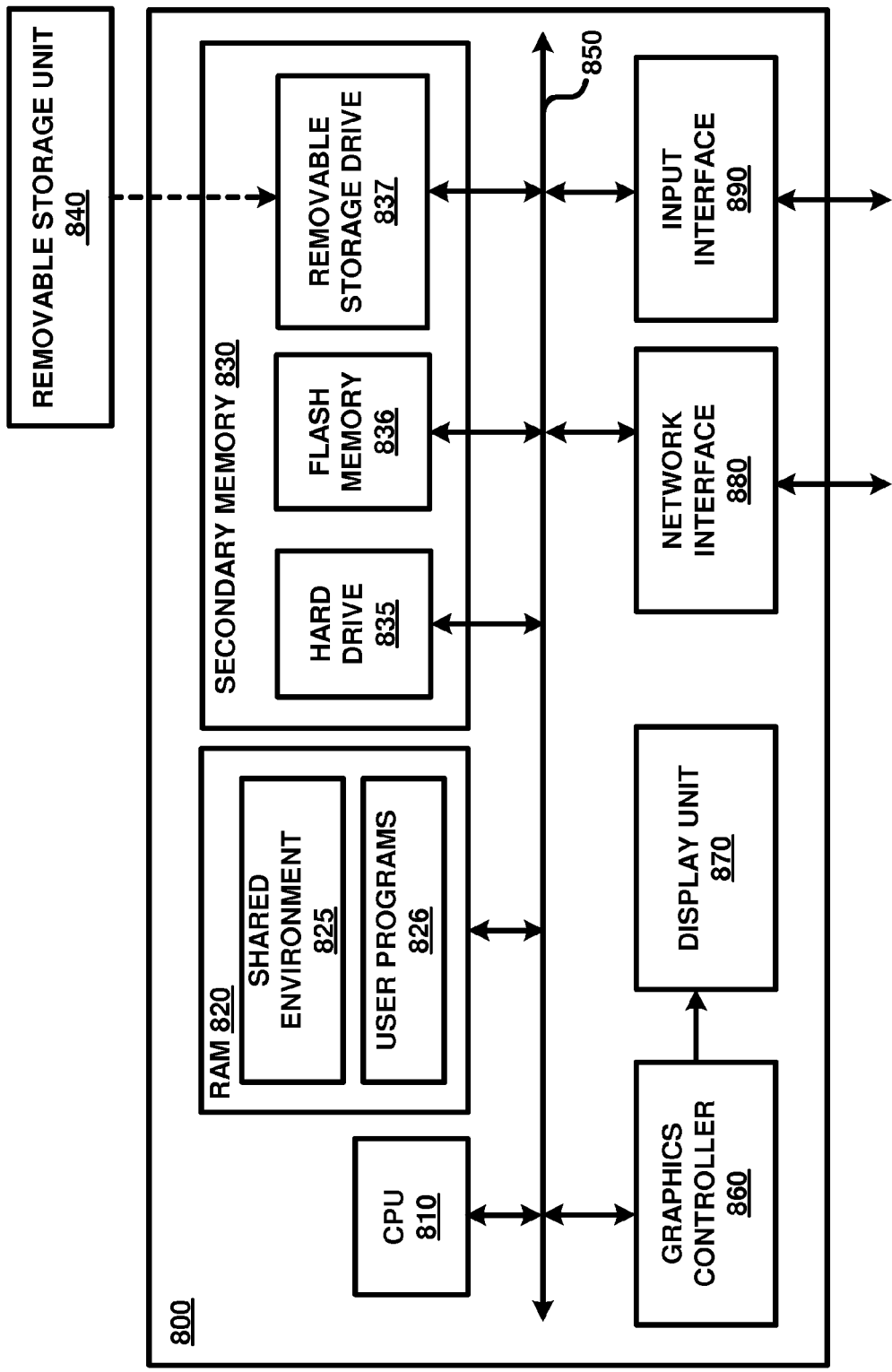
FIG. 8 is a block diagram illustrating the details of a digital processing system in which several aspects of the present invention are operative by execution of appropriate executable modules in one embodiment.

FIG. 8 is a block diagram illustrating the details of digital processing system 800 in which several aspects of the present invention are operative by execution of appropriate executable modules in one embodiment. Digital processing system 800 may correspond to server system 150 or any one of end user systems 160A-160X.

Digital processing system 800 may contain one or more processors (such as a central processing unit (CPU) 810), random access memory (RAM) 820, secondary memory 830, graphics controller 860, display unit 870, network interface 880, and input/output interface 890. All the components except display unit 870 may communicate with each other over communication path 850, which may contain several buses as is well known in the relevant arts.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826. Shared environment 825 contains utilities shared by user programs, and such shared utilities include operating systems, virtual machines, etc., which provide a (common) run-time environment for execution of user programs 826 (such as browsers, email client software).

Graphics controller 860 generates display signals (e.g., in RGB format) to display unit 870 based on data/instructions received from CPU 810. Display unit 870 contains a display screen to display the images defined by the display signals (for example, portions of the user interface shown in FIGS. 3A-3C). Input/output interface 890 includes input as well as output devices to enable a user to interact with system 800 (for example, to interact with the user interface of FIGS. 3A-3C such as selecting indicator 350). Network interface 880 provides the physical, electrical and protocol implementations that enable system 800 to communicate with other systems of FIG. 1 using protocols such as TCP/IP.

Secondary memory 830 (representing a non-transitory storage/medium) may contain hard drive 835, flash memory 836, and removable storage drive 837. Secondary memory 830 may store data (for example, portions of data shown in FIG. 6) and software instructions (for example, for performing the steps of FIG. 2, portions of instructions shown in FIGS. 5 and 7), which enable digital processing system 800 to provide several features in accordance with the present invention, as described above.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 830. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating users to view temporal values for multiple fields, said method comprising:
   maintaining a temporal data associated with a first field and a second field,
   wherein said temporal data specifies a first sequence of time instances and a respective value to which said first field is set at each of said first sequence of time instances, said first sequence of time instances containing a first time instance and a second time instance,
   wherein said temporal data also specifies a second sequence of time instances and a respective value to which said second field is set at each of said second sequence of time instances, said second sequence of time instances not including said second time instance but including a third time instance at which an old value for said second field is changed to a new value;
   displaying on a display unit, a first value for a first field and a second value for said second field, wherein said first value and said second value are temporal values at said first time instance for said first field and said second field respectively according to said temporal data;
   receiving an input data representing said second time instance;
   examining said temporal data to determine a third value and a fourth value for said first field and said second field respectively at said second time instance,
   wherein said third value is the value of said first field retrieved from said temporal data corresponding to said second time instance,
   wherein said fourth value is set to said old value if said second time instance is less than said third time instance and to said new value otherwise; and
   updating said display unit, in response to receiving of said input data representing said second time instance, said third value for said first field and said fourth value for said second field, wherein said third value and said fourth value are temporal values at said second time instance for said first field and said second field respectively.

2. The method of claim 1, further comprising:
   displaying on said display unit, said first sequence of time instances associated with said first field;
   receiving a selection of one of said first sequence of time instances as said second time instance, wherein said selection comprises said input data,
   wherein said input data is received associated with said first field, but said updating is performed for both of said first field and said second field.

3. The method of claim 2, wherein said first field represents a variable whose value is displayed as a corresponding data point of a graph, and said second field represents a text variable having different values at corresponding time instances.

4. The method of claim 2, wherein said displaying displays an indicator associated with said first field to indicate that said first field has temporal values that can be viewed by a user by operating said indicator,
   wherein said displaying displays said first sequence of time instances as the time instances at which said first field has temporal values upon a user selecting said indicator.

5. The method of claim 2, wherein all of said first value, said second value, said third value and said fourth value are displayed simultaneously on said display unit as a part of said updating,
   wherein said first value and said third value are displayed correlated according to a first visual convention on said display unit to indicate said first value and said third value are temporal values for said first field,
   wherein said first value and said second value are displayed according to a second visual convention on said display unit, while said third value and said fourth value are displayed according to a third visual convention on said display unit,
   wherein said second visual convention and said third visual convention are together designed to communicate that said third value and said fourth value are temporal values at a time instance different from the time instance for which said first value and said second value correspond to, for the same said first field and said second field.

6. The method of claim 5, wherein said third visual convention displays said third value and said fourth value in a foreground compared to said second visual convention that displays said first value and said second value in a background.

7. The method of claim 1, wherein said first field and said second field are contained in a plurality of fields of a web page, said method further comprising:
   enabling a developer of said web page to add a notation in said web page to indicate which ones of said plurality of fields have temporal values;

processing said web page to determine that said notation is added for said first field and for said second field, and not for a third field of said plurality of fields; and including in said web page, in response to said processing, an indicator instruction for said first field and said second field, and not for said third field, wherein said indicator instructions causes said indicator to be displayed associated with said first field and said second field to indicate that said first field and said second field have temporal values that can be viewed by said user by operating the corresponding indicator.

8. The method of claim 7, wherein said developer specifies a first set of time instances for said first field, said first set of time instances being contained in said first sequence of time instances, wherein said processing further comprises:

retrieving from a data source, in response to determining that said notation is added for said first field, a first set of values at said first set of time instances for said first field;

computing a second set of values at said first set of time instances for said second field based on said respective value specified for said second sequence of time instances; and incorporating said first set of values and said second set of values along with said first set of time instances in said web page, wherein said updating comprises identifying said third value for said first field and said fourth value for said second field respectively from said first set of values and said second set of values incorporated in said web page.

9. The method of claim 1, wherein said updating said first field comprises replacing said first value with said third value such that only said third value is displayed for said first field.

10. A non-transitory machine readable medium storing one or more sequences of instructions for causing a system to facilitate users to view temporal values for multiple fields, wherein execution of said one or more instructions by one or more processors contained in said system causes said system to perform the actions of:

displaying on a display unit, a first value for a first field and a second value for a second field, wherein said first value and said second value are temporal values at a first time instance for said first field and said second field respectively;

receiving an input data representing a second time instance;

examining a temporal data to determine a third value for said first field at said second time instance, wherein said temporal data specifies a first sequence of time instances and a respective value to which said first field is set at each of said first sequence of time instances, said first sequence of time instances containing said first time instance and said second time instance, wherein said temporal data further specifies a second sequence of time instances and a respective value to which said second field is set at each of said second sequence of time instances, said second sequence of time instances not including said second time instance but including a third time instance at which an old value for said second field is changed to a new value, wherein said third value is the value of said first field retrieved from said temporal data corresponding to said second time instance, wherein said examining determines a fourth value for said second field at said second time instance, wherein said fourth value is set to said old value if said second time instance is less than said third time instance and to said new value otherwise; and updating said display unit, in response to receiving of said input data representing said second time instance, said third value for said first field and said fourth value for said second field, wherein said third value and said fourth value are temporal values at said second time instance for said first field and said second field respectively.

11. The machine readable medium of claim 10, further comprising:

displaying on said display unit, said first sequence of time instances associated with said first field;

receiving a selection of one of said first sequence of time instances as said second time instance, wherein said selection comprises said input data, wherein said input data is received associated with said first field, but said updating is performed for both of said first field and said second field.

12. The machine readable medium of claim 11, wherein said first field represents a variable whose value is displayed as a corresponding data point of a graph, and said second field represents a text variable having different values at corresponding time instances.

13. The machine readable medium of claim 11, wherein said displaying displays an indicator associated with said first field to indicate that said first field has temporal values that can be viewed by a user by operating said indicator, wherein said displaying displays said first sequence of time instances as the time instances at which said first field has temporal values upon a user selecting said indicator.

14. The machine readable medium of claim 11, wherein all of said first value, said second value, said third value and said fourth value are displayed simultaneously on said display unit as a part of said updating, wherein said first value and said third value are displayed correlated according to a first visual convention on said display unit to indicate said first value and said third value are temporal values for said first field, wherein said first value and said second value are displayed according to a second visual convention on said display unit, while said third value and said fourth value are displayed according to a third visual convention on said display unit, wherein said second visual convention and said third visual convention are together designed to communicate that said third value and said fourth value are temporal values at a time instance different from the time instance for which said first value and said second value correspond to, for the same said first field and said second field.

15. A digital processing system comprising:

a processor;

a random access memory (RAM);

a display unit;

a machine readable medium to store one or more instructions, which when retrieved into said RAM and executed by said processor causes said digital processing system to facilitate users to view temporal values for multiple fields, said digital processing system performing the actions of:

displaying on said display unit, a first value for a first field and a second value for a second field, wherein said first value and said second value are temporal values for said first field and said second field respectively at a current time instance indicated on said digital processing system;

receiving an input data representing a second time instance which is prior to said current time instance;

examining a temporal data to determine a third value for said first field at said second time instance, wherein said temporal data specifies a first sequence of time instances and a respective value to which said first field is set at each of said first sequence of time instances, said first sequence of time instances containing said first time instance and said second time instance, wherein said temporal data further specifies a second sequence of time instances and a respective value to which said second field is set at each of said second sequence of time instances, said second sequence of time instances not including said second time instance but including a third time instance at which an old value for said second field is changed to a new value, wherein said third value is the value of said first field retrieved from said temporal data corresponding to said second time instance, wherein said examining determines a fourth value for said second field at said second time instance, wherein said fourth value is set to said old value if said second time instance is less than said third time instance and to said new value otherwise; and updating said display unit, in response to receiving of said input data representing said second time instance, a third value for said first field and a fourth value for said second field, wherein said third value and said fourth value are temporal values at said second time instance for said first field and said second field respectively.

16. The digital processing system of claim 15, further performing the actions of:

displaying on said display unit, said first sequence of time instances associated with said first field;

receiving a selection of one of said first sequence of time instances as said second time instance, wherein said selection comprises said input data, wherein said input data is received associated with said first field, but said updating is performed for both of said first field and said second field.

17. The digital processing system of claim 16, wherein said first field represents a variable whose value is displayed as a corresponding data point of a graph, and said second field represents a text variable having different values at corresponding time instances.

18. The digital processing system of claim 15, wherein said displaying displays an indicator associated with said first field to indicate that said first field has temporal values that can be viewed by a user by operating said indicator, wherein said digital processing system displays said first sequence of time instances as the time instances at which said first field has temporal values upon a user selecting said indicator, said first sequence of time instances being specified relative to said current time instance.

19. The digital processing system of claim 16, wherein all of said first value, said second value, said third value and said fourth value are displayed simultaneously on said display unit as a part of said updating, wherein said first value and said third value are displayed correlated according to a first visual convention on said display unit to indicate said first value and said third value are temporal values for said first field, wherein said first value and said second value are displayed according to a second visual convention on said display unit, while said third value and said fourth value are displayed according to a third visual convention on said display unit, wherein said second visual convention and said third visual convention are together designed to communicate that said third value and said fourth value are temporal values at a time instance different from the time instance for which said first value and said second value correspond to, for the same said first field and said second field.

* * * * *